United States Patent
Hoenninger

[11] Patent Number: 5,320,312
[45] Date of Patent: Jun. 14, 1994

[54] CABLE CLUSTER MOUNT

[75] Inventor: Thomas J. Hoenninger, Blue Bell, Pa.

[73] Assignee: Stainless, Inc., North Wales, Pa.

[21] Appl. No.: 58,484

[22] Filed: May 5, 1993

[51] Int. Cl.⁵ .............................................. F16L 3/22
[52] U.S. Cl. .................................. 248/68.1; 211/107;
248/230
[58] Field of Search ................ 248/68.1, 65, 230, 69;
174/148, 158 R, 163 R; 211/107

[56] References Cited

U.S. PATENT DOCUMENTS

| | | | |
|---|---|---|---|
| 2,708,686 | 5/1955 | Bernard | 248/65 X |
| 3,353,774 | 11/1967 | Thomas | 248/68.1 |
| 3,404,858 | 10/1968 | Levy | 248/68.1 |
| 4,103,853 | 8/1978 | Bannan | 211/107 X |
| 4,136,423 | 1/1979 | Sterling | 24/122.6 |
| 4,676,472 | 6/1987 | Kamrud, Sr. | 248/542 |
| 4,715,571 | 12/1987 | Soltow et al. | 248/68.1 |
| 4,763,132 | 8/1988 | Juds et al. | 343/890 |
| 4,795,856 | 1/1989 | Farmer | 174/40 |
| 4,813,639 | 3/1989 | Midkiff et al. | 248/68.1 |
| 4,864,697 | 9/1989 | Sparks | 248/68.1 X |
| 4,993,670 | 2/1991 | Tesar | 248/68.1 |
| 5,022,615 | 6/1991 | Parks | 248/74.1 |
| 5,033,701 | 7/1991 | Kraus | 248/68.1 |
| 5,035,383 | 7/1991 | Rainville | 248/68.1 |

FOREIGN PATENT DOCUMENTS

| | | | |
|---|---|---|---|
| 478356 | 11/1951 | Canada | 174/158 R |
| 2736730 | 2/1979 | Fed. Rep. of Germany . | |
| 340048 | 4/1936 | Italy | 174/158 R |

Primary Examiner—J. Franklin Foss
Attorney, Agent, or Firm—Volpe and Koenig

[57] ABSTRACT

A multiple-cable mount for securing cable hangers to a support member on an antenna tower is described. The mount generally surrounds the support member, and includes spacing members positioned on the interior of the mount and a securing means for attaching the mount to a support member. Cable hangers are attached to the outer perimeter of the mount.

19 Claims, 5 Drawing Sheets

CABLE CLUSTER MOUNT

BACKGROUND OF THE INVENTION

1. Field of the Invention

This invention generally relates to cable mounts. More particularly, it relates to a means and method for mounting transmission lines on antenna towers.

2. Description of the Prior Art

Various mounts, supports, hangers and clamps are employed to secure cables, conductors, and transmission lines to an antenna tower. The mounts are attached at periodic spacings along the legs and structural members of the tower. Since several antennas are often mounted on the tower, dozens of transmission lines may run along the antenna tower. In such instances, multiple cable or cluster mounting systems are used to secure the transmission lines.

The cables are exposed to the elements and are subject to the forces placed upon them by the wind. One cause of cable failure is the breakage of the conductor due to prevailing winds. Even if the cable does not break cleanly, the whipping action caused by the wind may have a cumulative destructive effect on the life of the cable and the tower. Since antenna tower heights can reach a thousand feet, the weight of thousands of feet of cable and numerous mounts must be taken into account when designing an antenna tower structure.

In addition to increasing the weight loading on the antenna towers, multiple-cable mounts may significantly increase the wind load on the tower. Since towers must be designed to withstand these additional loads, the cost associated with designing and erecting a tower is increased.

Another drawback of prior art cable mounts is that they do not allow easy access for the attachment of additional cable hangers. Hangers are often attached to the cross-members of the antenna tower structure, using any available position on the tower. Also, the placement of cable mounts may impede access of maintenance personnel by making it increasingly difficult to climb the tower.

U.S. Pat. No. 4,813,639, issued Mar. 21, 1989 to Midkiff et al., attempts to solve the problem regarding an orderly arrangement of cables. This patent discloses a cluster mounting system for supporting multiple transmission lines along the side of an antenna tower. Midkiff et al. uses a polygon-shaped cable support section which is affixed to a leg of the antenna tower and extends away from the antenna tower support.

SUMMARY OF THE INVENTION

The present invention includes a body member or band which generally surrounds a structural leg member or support member of an antenna tower. The body has outwardly extending ends that slip around the support member and secure the body. Spacing members are attached to the interior of the body member. As the ends of the body member are secured together, the spacing members engage the support member and fix the mount to the support member. Cable hangers are attached to the periphery of the body member to secure transmission lines to the cluster mount.

DETAILED DESCRIPTION OF THE PREFERRED EMBODIMENT

Figure 1:
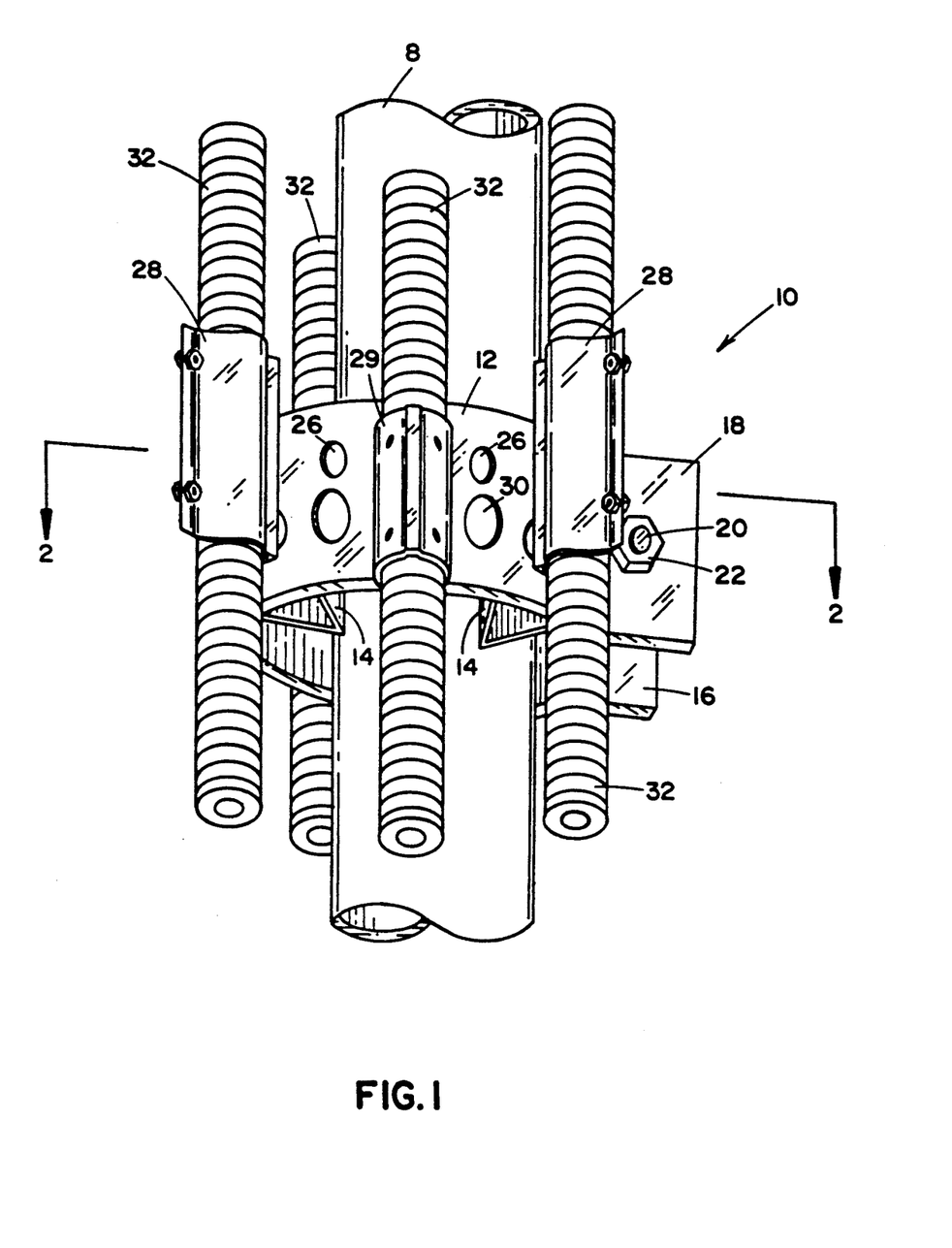
FIG. 1 is a perspective view showing the multiple-cable mount supporting a plurality of transmission lines according to the preferred embodiment of the present invention.

With reference to FIG. 1, the preferred embodiment of the multiple-cable cluster mount is generally indicated at 10. The relative position of the mount 10 with respect to a support member 8 is shown as being spaced from the support member 8. The support member 8 is preferably a portion of a leg which forms part of the structure of an antenna tower. Although support member 8 is shown as being tubular or circular, it may have other shapes.

Figure 2:
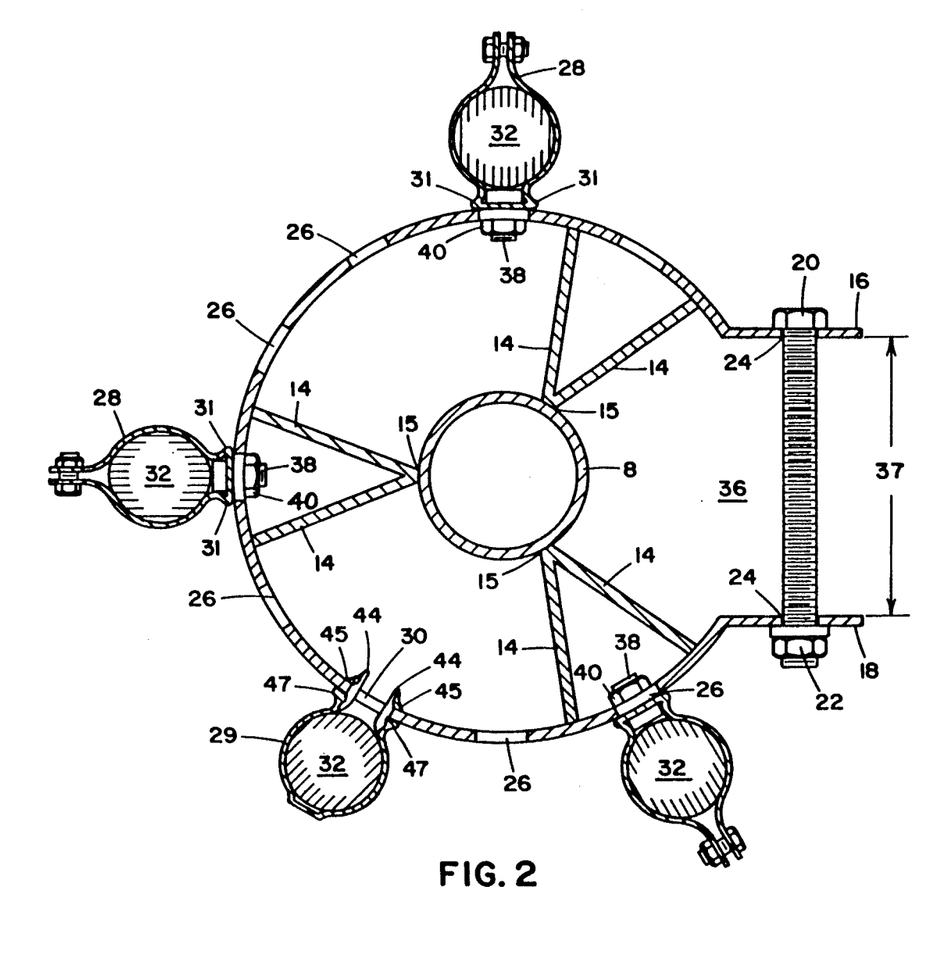
FIG. 2 is a cross-sectional top view of the mount in accordance with the present invention as taken along line II—II.

As seen in FIGS. 1 and 2, body member 12 surrounds the support member 8. As shown, body 12 has a generally circular cross-section. However, the body's shape may change depending on functional restraints, e.g., the shape of the support member, or for aesthetic reasons. A plurality of stand-offs or spacing members 14 are attached to the interior of the body 12. There should be at least two, but preferably three, spacing members 4 attached to the inside surface of the body 12. The spacing members 14 are preferably spaced equidistantly around the inner surface. Accordingly, if three spacing members 14 are used, they are spaced 120° apart from each other about the interior of the body 12.

The preferred spacing members 14 are angularly shaped, with the two sides being of equal length. The apex 15 of the spacing members 14 forms a line of frictional contact with the support member 8. Although the spacing members 14 are shown to be of an angular shape, they may be suitably shaped to meet functionality requirements. In addition, when the support member 8 does not have a regular cross-section, each spacing member may be specifically shaped.

Still with reference to FIGS. 1 and 2, first and second ends 16, 18, respectively, extend outwardly from the body 12. These ends define the throat section 36. An adjusting means draws the first and second ends 16, 18 together in order to secure the mount 10 to the support member 8.

Figure 3:
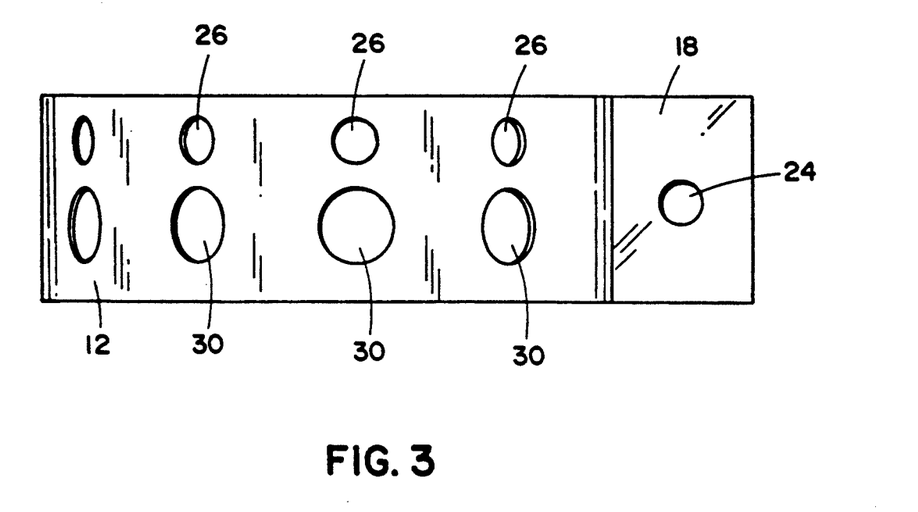
FIG. 3 s a side view of the mount, showing the connecting apertures.

Referring to FIGS. 2 and 3, the first and second ends 16, 18 each have an aperture 24 to allow a securing means, such as bolt 20, to pass through and between them. The matching nut 22 is tightened to secure the mount 10 to the support member 8, by drawing the three spacing members 14 into securing contact with the support member 8. Other means may be used for securing the mount 10 to the support member 8.

With reference to FIGS. 2 and 3 again, a plurality of cable hanger apertures 26, 3 are located on the perimeter of the body 12. In the preferred embodiment, the hanger apertures 26, 30 are situated equidistant about the perimeter of a circular body member 12. The hanger apertures 26, 30 can be of any shape and size to allow the attachment of a variety of cable hangers. For example, one standard cable hanger 28 requires a 7/16 inch diameter aperture 26. Similarly, a known snap-in type cable hanger 29 requires a ⅜ inch diameter aperture 30.

The known cable hangers 28, for example Model No. 42396A-2, manufactured by the Andrew Corporation, utilize a bolt and nut arrangement for securement. Hanger bolt 38 is inserted through aperture 26 and the hanger shoulder 31 abuts the body 12. Matching hanger nut 40 is then tightened to secure cable hanger 28 to body 12. Snap-in type cable hangers 29, of the type disclosed in U.S. Pat. No. 4,763,132, have prongs 44 Which are squeezed together and inserted through hanger aperture 30. The description of the hangers set forth in this patent is incorporated herein by reference. After the prongs 44 clear aperture 3, the pressure is released and the prongs 44 expand against the inside of the aperture 30 while detents 45 and feet 47 engage the body 12.

The cable hangers 28, 29 are used to secure a cable or transmission line 32 to the mount 10. Cable hangers are designed to accommodate a Variety of transmission lines and waveguides. As will be known to those skilled in the art, cable hangers for use with coaxial cable, twin lead, semi-rigid cable, and various other balanced and unbalanced transmission lines are readily available.

The type of cable hangers which are to be utilized also influences the size of the spacing members 14. The spacing members 14 provide sufficient clearance to attach and/or remove the cable hangers as the situation requires. Cable hangers which use a bolt and nut arrangement usually require more clearance than the snap-in type hangers. Although the space between the body 12 and the support member 8 must only be sufficient to accommodate the size of the hanger nut 40, it is desirable to allow additional installation clearance. A one inch to three inch clearance between the body 12 and the support member 8 is preferred.

The following describes the installation of the cable mount 10 of the instant invention. Cable hangers 28 may be attached to the body 12 before installation. However, it is preferred to attach cable hangers 28, 29 after the mount 10 has been installed. The first and second ends 16, 18 are spread apart in order to accommodate the physical dimensions of the support member 8. For example, when the support member 8 has a circular cross-section, the ends 6, 8 are spread apart by a distance that is at least the diameter of the support member 8. The support member 8 passes through the throat 36 formed by first and second ends 16, 18. The mount 10 is positioned so that the support member 8 is located generally in the center of the body 12.

The mount 10 can be slid up and down the support member 8 into its desired position. Once this position is located, securing bolt 20 is inserted through apertures 24 of the first and second ends 16, 18. Matching nut 22 is tightened, thus constricting throat 36 by drawing first and second ends 16, 18 together, to bring spacing members 14 into contact with support members 8. Nut 22 must be sufficiently tight to rigidly secure the mount 10 to the support member 8. It is preferable to provide some locking device to prevent the loosening of nut 22.

Since the installation and removal of the mount 10 generally requires that the first and second ends 16, 18 be spread apart, it is preferable that the body 12 and ends 16, 18 be a unitary construction of a flexible metal. In the preferred embodiment, the mount 10 is made of stainless steel. Alternatively, it may be made of aluminum, copper, carbon steel, plastic, or other polymer materials.

Referring to FIG. 2 again, an exemplary support member 8 of approximately six inches in diameter would use a body 12 of approximately nine inches in diameter. Each side of spacing members 14 would be approximately 1 and ½ inches long. In order to accommodate as many cable hangers as possible, the throat 36 is normally smaller than the diameter of the support member 8. For a six inch diameter support member 8 and a nine inch diameter body 12, the preferred throat opening 36 as installed at 37 is approximately 4 and ½ inches. In the preferred embodiment, the body 12 is approximately two inches high and approximately ⅛ inch thick. The remaining dimensions of body 12 are determined principally by the size and number of the hanger holes.

Figure 4:
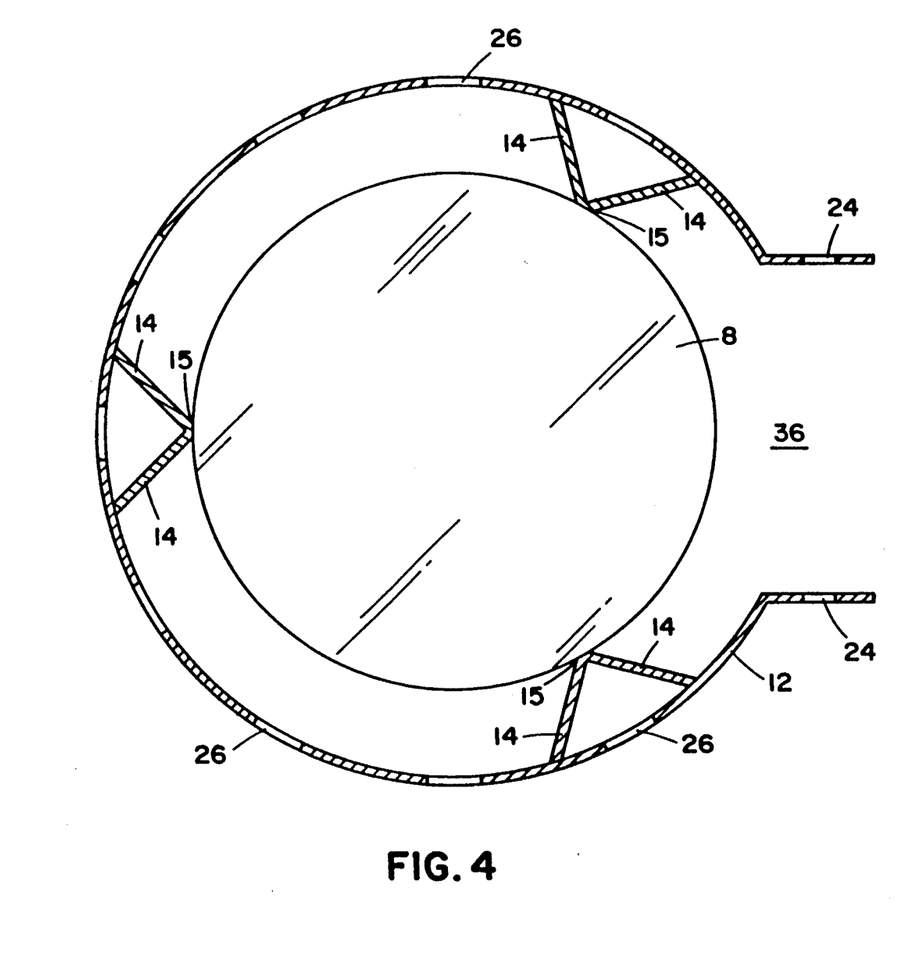
FIG. 4 is a cross-sectional top view of the cable mount, according to the present invention, for use with a larger diameter support member.

A second embodiment of the instant invention is shown in FIG. 4. Like elements in FIG. 4 are identified by the same reference numerals as used in FIGS. 1, 2 and 3. This embodiment illustrates the invention when the support member 8 increases in size. As noted earlier, spacing members 14, and, in some instances, body member 12, must be adjusted to accommodate various sizes and shapes of support members.

Figure 5:
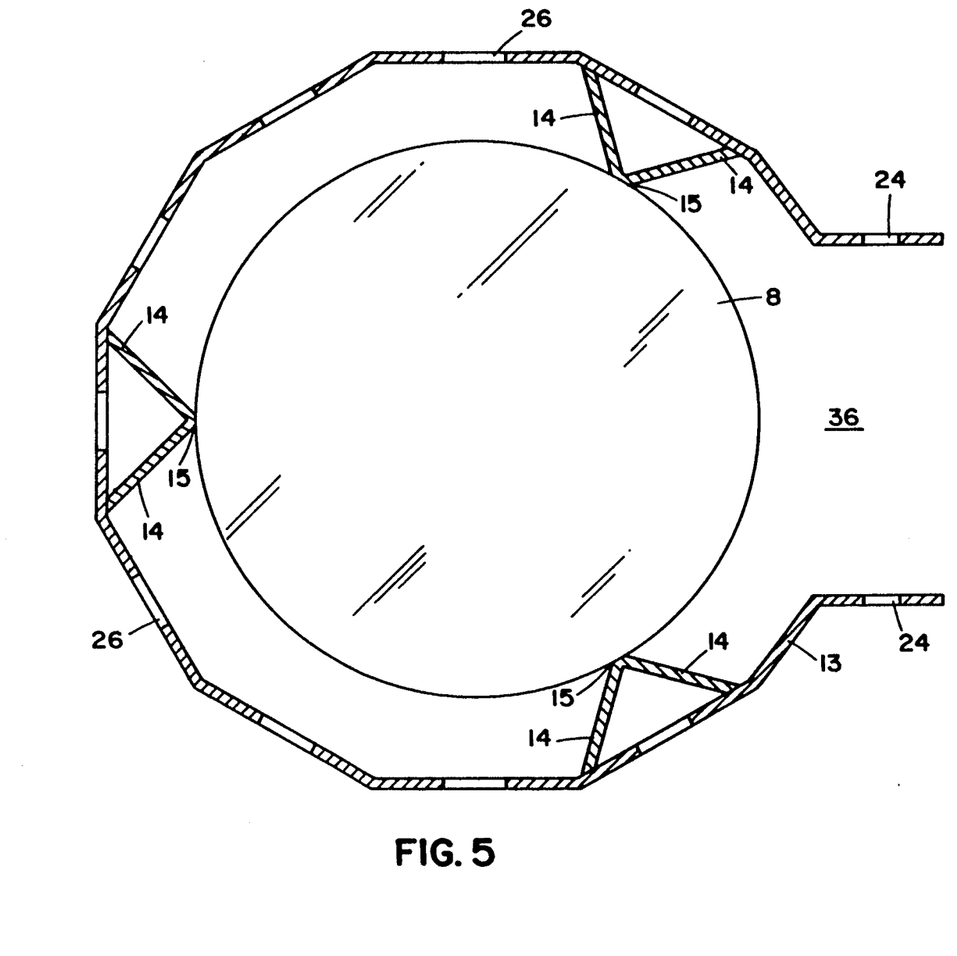
FIG. 5 is a cross-sectional top view of an alternative embodiment of the cable mount, according to the present invention, wherein the body member is polygonal in shape.

A third embodiment of the cluster mount of this invention is shown in FIG. 5. The body member 13 is of a generally polygonal shape. Hanger apertures 26, 30 are located on each face of the polygonal body member 13. Spacing members 14 are attached to the interior of body member 13 and spaced equidistantly apart.

The present invention positions the cables or transmission lines proximate the tower's structural member in an efficient arrangement. Since the center of mass is closer to the support structure, the moment on the structure is reduced and this, in turn, reduces the loading on the structure. The present invention also reduces wind loading since it is more aerodynamic than previous multiple-cable mounts.

What is claimed is:

1. A cable cluster mount for attachment to a support member, the mount comprising:
    (a) a continuous body member which generally surrounds the support member, the body member has a plurality of cable hanger attachment positions defined in the continuous body and depending ends that define a passageway into the body member;
    (b) a plurality of spacers positioned on the interior of the body member; and
    (c) adjusting means for drawing the depending ends of the body member toward each other and the spacers into contact with the support member.

2. The cable mount of claim 1 wherein the body member has a generally circular cross-section.

3. The cable mount of claim 1 wherein there are at least three spacing members.

4. The cable mount of claim 3 wherein the spacing members are equidistantly spaced around the interior of the body member.

5. The cable mount of claim 1 wherein the spacing members are substantially angularly shaped with the apex of each spacing member being in contact with the support member.

6. The cable mount of claim 1 wherein the cable hanger attachment positions are apertures in the body member.

7. The cable mount of claim 1 wherein the spacing members space the body member from the support member by a distance that is at least equal to the distance required for the attachment of cable hangers.

8. The cable mount of claim 1 wherein the adjusting means comprises:
   (a) an outward extension on each depending end, each extension having a securing aperture;
   (b) a bolt, extending through the securing apertures in the depending ends; and
   (c) a matching nut screwed onto the end of the bolt which, when tightened, draws the ends together securing the mount to the support member.

9. The cable mount of claim 1 wherein the body member has a generally polygonal cross-section.

10. The cable mount of claim 9 wherein each of the plurality of cable hanger attachment positions is located on a respective face of the polygonal body member.

11. The cable mount of claim 10 wherein the spacing members space the polygonal member from the support member by a distance that is at least equal to the distance required for the attachment of cable hangers.

12. The cable mount of claim 11 wherein the spacing members are equidistantly spaced around the interior of the polygonal member.

13. The cable mount of claim 12 wherein the spacing members are substantially angularly shaped, with the apex of each spacing member being in contact with the support member.

14. The cable mount of claim 13 wherein having cable hanger attachment positions are defined by the body member having apertures.

15. A multiple-cable mount for attachment to a support member, the mount comprising:
   (a) a generally circular, continuous body member which surrounds the support member, having a plurality of apertures which are configured to allow cable hangers to engage the body member and outwardly extending first and second ends that define a throat leading into the circular body portion;
   (b) a plurality of stand-offs attached to the interior of the body member; and
   (c) securement means for drawing the first and second ends of the body member toward each other, thereby securing the mount to the support member by frictionally engaging the stand-offs with the support member.

16. The multiple-cable mount of claim 15 wherein there are at least three stand-offs.

17. The multiple-cable mount of claim 16 wherein the stand-offs are equidistantly spaced about the interior of the body member.

18. The multiple-cable mount of claim 17 wherein the spacing members are substantially angularly shaped with the apex of the securing member being in contact with the support member.

19. The multiple-cable mount of claim 18 wherein the spacing members space the body member from the support member by a distance that is at least equal to the distance required for the attachment of cable hangers.

* * * * *

UNITED STATES PATENT AND TRADEMARK OFFICE
CERTIFICATE OF CORRECTION

PATENT NO. : 5,320,312

DATED : June 14, 1994

INVENTOR(S) : Thomas J. Hoenninger

It is certified that error appears in the above-identified patent and that said Letters Patent is hereby corrected as shown below:

At column 2, line 34, delete "4" and insert therefor --14--.

At column 2, line 64, delete "26, 3" and insert therefor --26, 30--.

At column 3, line 13, delete "Which" and insert therefor --which--.

At column 3, line 16, delete "3" and insert therefor --30--.

At column 3, line 22, delete "Variety" and insert therefor --variety--.

At column 3, line 47, delete "6,8" and insert therefor --16,18--.

UNITED STATES PATENT AND TRADEMARK OFFICE
CERTIFICATE OF CORRECTION

PATENT NO. : 5,320,312
DATED : June 14, 1994
INVENTOR(S) : Thomas J. Hoenninger

It is certified that error appears in the above-indentified patent and that said Letters Patent is hereby corrected as shown below:

At column 5, claim 14, line 28, delete "having" and insert therefor --the--; line 29, delete "the"; and line 30, delete "having"--.

Signed and Sealed this

Eleventh Day of October, 1994

Attest:

BRUCE LEHMAN

Attesting Officer

Commissioner of Patents and Trademarks